FIG. 2

Dec. 18, 1956  E. C. GROGAN  2,774,367
AIR-OPERATED CONTROLLER HAVING MANUALLY ADJUSTABLE RESTRICTIONS
GIVING INTEGRAL OR RESET, DIFFERENTIAL OR RATE, AND
PROPORTIONAL-BAND-ADJUSTMENT MODES OF OPERATION
Filed April 27, 1953  6 Sheets-Sheet 3

FIG. 3

*INVENTOR.*
EDWARD C. GROGAN
BY
ATTORNEY.

Dec. 18, 1956

E. C. GROGAN 2,774,367

AIR-OPERATED CONTROLLER HAVING MANUALLY ADJUSTABLE RESTRICTIONS
GIVING INTEGRAL OR RESET, DIFFERENTIAL OR RATE, AND
PROPORTIONAL-BAND-ADJUSTMENT MODES OF OPERATION

Filed April 27, 1953

*INVENTOR.*
EDWARD C. GROGAN

BY

ATTORNEY.

Dec. 18, 1956  E. C. GROGAN  2,774,367
AIR-OPERATED CONTROLLER HAVING MANUALLY ADJUSTABLE RESTRICTIONS
GIVING INTEGRAL OR RESET, DIFFERENTIAL OR RATE, AND
PROPORTIONAL-BAND-ADJUSTMENT MODES OF OPERATION
Filed April 27, 1953  6 Sheets-Sheet 6

*INVENTOR.*
EDWARD C. GROGAN

BY *Arthur H. Swanson*

ATTORNEY.

United States Patent Office 2,774,367
Patented Dec. 18, 1956

2,774,367

AIR-OPERATED CONTROLLER HAVING MANUALLY ADJUSTABLE RESTRICTIONS GIVING INTEGRAL OR RESET, DIFFERENTIAL OR RATE, AND PROPORTIONAL BAND-ADJUSTMENT MODES OF OPERATION

Edward C. Grogan, Philadelphia, Pa., assignor to Minneapolis-Honeywell Regulator Company, Minneapolis, Minn., a corporation of Delaware Application August 7, 1952, Serial No. 303,070

23 Claims. (Cl. 137—86)

The general object of the present invention is to provide a novel, elastic-fluid-pressure-actuated, controller, ordinarily an air controller, which is of the force balance type. The invention is adapted to provide proportional plus reset control, and when desired, to provide rate response also, and is characterized in particular, by its wide proportional band adjustment range. Theoretically, the possible proportional band range obtainable by the use of the invention may extend from minus 100% to infinity.

In my copending application, Serial No. 221,501, filed September 17, 1951; Patent 2,712,321; issued July 5, 1955; I have disclosed and claimed an air controller adapted to provide proportional plus reset control which comprises separate set-point, measured variable, positive feedback and negative feedback pressure chambers, cooperating to form a deviation unit. That unit operates to provide a control force which is a resultant of the pressures in the above mentioned chambers, and is varied in predetermined accordance with the extent and direction of deviations of a pressure which is indicative of the deviation of the value or condition of the measured variable from the predetermined set-point pressure, and is adjustable through a throttling range of considerable extent.

A primary object of the present invention is to provide a controller that will have an adjustable throttling range of practically unlimited extent.

A more specific object of the invention is to arrange the pressure chambers forming the controller and connect them to one another and to fluid pressure sources so that one of said portions with its associated connections will form a pressure and flow network for differentiating the error, or signal difference, between the process variable and set point pressures, and a second portion and associated connections will form a pressure and flow network for integrating the differential produced by the differentiating action of the first section.

In the preferred form of the present invention, the pressure chambers included in the two deviation units, and the pressure chambers forming an associated booster pilot section for transmitting a control pressure to a diaphragm motor valve or other ultimate control element, are combined in a single stack type air controller unit.

In the preferred form of the invention, the differentiating and integrating networks included in a controller, have circuit parameters adjustable to adapt the controller for use under widely different conditions.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
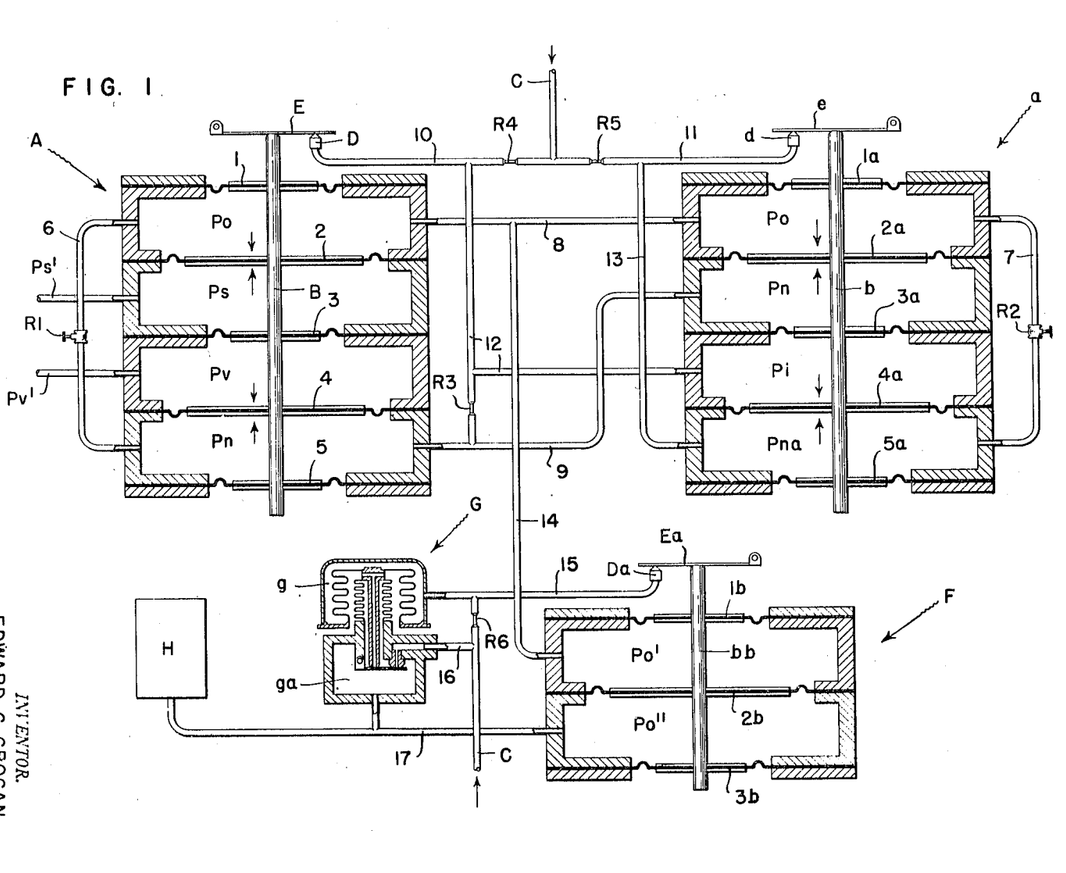
Fig. 1 is a schematic illustration or diagram of an air controller including essential features of the present invention.
Figure 3:
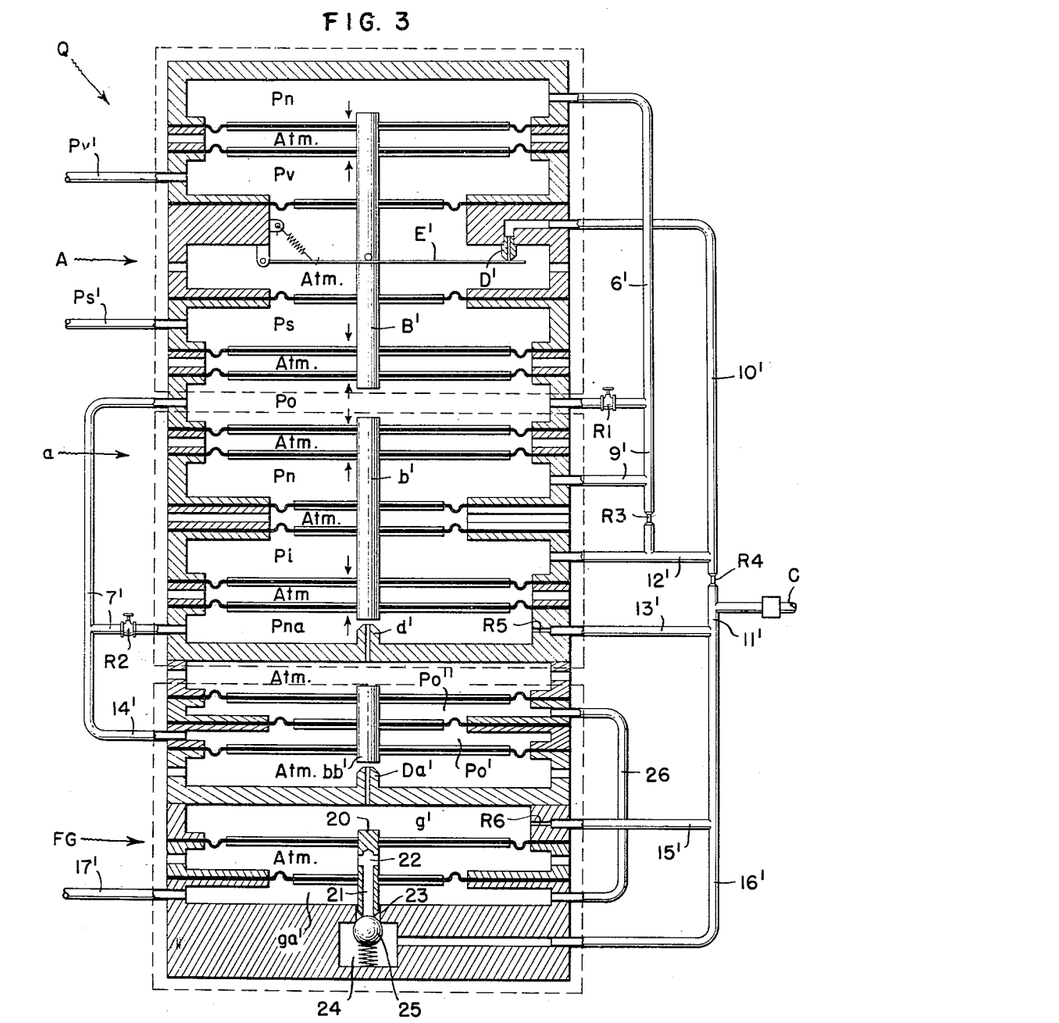
Fig. 3 is a sectional elevation of a stack type air controller embodying a desirable form of the invention shown diagrammatically in Fig. 1.

In Fig. 1, A designates a first deviation section or unit which, as diagrammatically shown, comprises a hollow cylinder divided into four parallel pressure chambers by transverse flexible walls 1, 2, 3, 4, and 5. While it is immaterial whether the axes of the unit A and other elements of Fig. 1 and of Fig. 3 are vertical, horizontal, or inclined, for convenience of description those elements will ordinarily be referred to herein as though they were arranged with their axes vertical, as shown. In practice, each of the flexible walls 1, 2, 3, 4, and 5, and analogous flexible walls shown in Fig. 1 and Fig. 3, is a flexible diaphragm having a stationary, peripheral portion attached to the corresponding cylinder wall and having a movable, central portion connected by an intermediate, flexible portion to the cylinder. As shown in Fig. 1, the transverse walls 1, 2, 3, and 4 form the top walls of pressure chambers respectively designated P$o$, P$s$, P$v$, and P$n$, and the walls 2, 3, 4, and 5 form the bottom walls, respectively, of the chambers P$o$, P$s$, P$v$, and P$n$. The movable central portions of the walls 1, 2, 3, 4, and 5 of the deviation section A are connected by a transverse rod or shaft B.

A control fluid pressure, which varies in magnitude with changes in a control process condition or variable, is transmitted to the pressure chamber P$v$ by the conduit P$v'$. A predetermined, ordinarily adjustable, set-point air pressure is transmitted to the chamber P$s$ by a conduit P$s'$. For convenience the symbols P$o$, P$s$, P$v$ and P$n$ not only designate the different pressure chambers of the deviation unit A, as above described, but also designate the fluid pressures in those chambers in pounds per square inch or other suitable unit.

A second deviation section $a$ of the controller shown in Fig. 1, is structurally like the unit A in that it comprises a rigid, hollow cylinder and transverse, flexible walls or diaphragms 1$a$, 2$a$, 3$a$, 4$a$, and 5$a$, which are like the walls 1, 2, 3, 4, and 5, in that each comprises a central portion connected by a flexible, annular, intermediate portion of the diaphragm to the corresponding stationary, peripheral portion of the latter. The four chambers of the deviation section $a$ are designated P$o$, P$n$, P$i$, and P$na$, and those symbols designate the fluid pressures in the corresponding chambers in the same pressure units as those used in the deviation section A. The central portions of the walls 1$a$, 2$a$, 3$a$, 4$a$, and 5$a$ are connected by a transverse rod or shaft $b$. The rods or shafts B and $b$ are coaxial with the flexible walls to which they are, respectively, connected and each serves as an air valve actuator, as is hereinafter explained.

The chambers P*o* and P*n* of the unit A are connected by a pressure equalizing conduit 6 including a regulable reset adjustment section or restriction R1. The latter may well be, and ordinarily is, a needle valve. The chambers P*na* and P*o* of the unit *a* are connected by a pressure equalizing conduit 7 including a regulable, proportional-band-adjustment section R2. The latter may be, and ordinarily is, a needle valve. The two chambers P*o* of the units A and *a* are connected by an unrestricted conduit 8, and the two chambers P*n* of the units A and *a* are connected by an unrestricted conduit 9.

Clean, actuating air under a predetermined, constant pressure, which may well be of the order of 15 to 20 pounds per square inch, is supplied by a pipe C to the control apparatus shown in Fig. 1. The pipe C is connected to a bleed nozzle D by a conduit 10 including a restriction R4, and is connected to a bleed nozzle *d* by a conduit 11 including a restriction R5. The escape of air through the bleed orifice of the bleed nozzle D is regulated by a valve E. The latter is shown as of the flapper valve type, and is biased for movement into the position in which it closes the bleed outlet of the nozzle D. Normally the valve E is displaced more or less from the nozzle D by the valve actuating rod B. The outflow of air through the bleed orifice of the nozzle *d* is controlled by a valve *e* like the previously mentioned valve E. The valve *e* is biased for movement into a position in which it closes the bleed orifice of the nozzle *d*, but is normally displaced more or less from the latter by the rod or shaft portion *b* of the deviation unit *a*. Air under the pressure in the bleed nozzle D is transmitted from the conduit 10 to the chamber P*i* of the deviation section *a* through a conduit 12. The latter is also connected to the conduit 9 through a rate restriction R3. The latter may be a fixed restriction, or a needle valve or the like, as conditions make desirable. The pressure in the portion of the conduit 11 between the restriction R5 and the bleed nozzle *d* is transmitted by a conduit 13 to the negative feedback chamber P*na* of the devation section *a*.

The pressure in the chambers P*o* is transmitted through the conduits 8 and 14 to the inlet chamber P*o*' of a booster pilot section F. The latter, in the form shown, comprises a hollow cylinder and three transverse flexible walls 1*b*, 2*b*, and 3*b*, which may be similar in type to the walls 1, 2, and 3 of the deviation section A. As diagrammatically shown, the walls 1*b* and 2*b* form the top and bottom walls, respectively, of the chamber P*o*', and the walls 2*b* and 3*b* form the top and bottom walls, respectively, of a chamber P*o*". The central portions of the walls 1*b*, 2*b*, and 3*b* are connected by a shaft or rod *bb* which cooperates with a flapper valve E*a*, a bleed nozzle D*a* and a pilot valve G to maintain a controlled air pressure in the chamber P*o*". That ratio may well be, and is herein assumed to be, 1 to 1. The pressures P*o*' and P*o*" are each equal to the pressures in the chambers P*o* of the sections A and *a*.

The nozzle D*a* receives air through a restriction R6 from a branch of the supply pipe C. The pressure in the bleed nozzle D*a* is transmitted through a conduit 15 to the control pressure chamber *g* of the pilot valve G. The latter may well be of the high capacity, non-bleed type disclosed in the Moore Patent 2,303,891 of December 1, 1942, including in addition to its control chamber *g*, a controlled air pressure chamber *ga*. The latter has its inlet connected through a conduit 16 to a supply pipe branch C, and has its outlet connected through a conduit 17 to the chamber P*o*", and to a diphragm valve or other ultimate control element H. Thus, on an increase or decrease in the pressure transmitted to the chambers P*o*' and P*o*", the booster pilot section F operates through the flapper valve E*a* and bleed nozzle D*a* to correspondingly increase or decrease the pressure in the chamber *g* of the pilot valve G. The latter then operates in a known manner to correspondingly increase or decrease the pressure in the conduit 17 and thereby in the chamber P*o*" and in the ultimate control element H.

In practice, the areas of the flexible walls at the top and the bottom of each of the pressure chambers P*o*, P*v*, P*s*, P*n*, P*i*, and P*na* are so relatively proportioned that the pressure in each of said chambers subjects the corresponding rod or shaft B or *b* to a bias force, acting on the rod and tending to move the latter in the direction indicated by the small arrow adjacent the rod in each of the pressure chambers. The bias force to which the rod is subjected by the pressure in each pressure chamber, is proportional to the product of the pressure per square inch in the chamber, multiplied by the differential of the areas in square inches of the flexible diaphragms at the top and the bottom of the chamber. In the deviation unit A, each pressure chamber considered by itself, tends to move the corerponding rod B up or down and thereby respectively decrease or increase the pressure in the bleed nozzle D, accordingly as the arrow in the pressure chamber points upward or downward. Similarly, the pressure in each of the pressure chambers P*o*, P*n*, P*i*, and P*na* of the deviation unit *a*, tends to decrease or increase the pressure in the bleed nozzle *d*, accordingly as the arrow in the pressure chamber points upward or downward.

In ordinary practice, the control apparatus shown diagrammatically in Fig. 1, is automatically actuated on and in response to a variation in the pressure P*v* of the measured variable, to increase or decrease the control pressure transmitted to the ultimate control element H in the direction and to the extent required to restore the predetermined ratio between the set-point pressure P*s* and the measured variable pressure P*v*. The only direct and immediate effects on the control apparatus shown in Fig. 1, of deviations of the pressure P*v* relative to the pressure P*s*, aside from the pressure variations in the chamber P*v*, are variations in the pressures in the bleed nozzles D and *d*, and hence in the pressures maintained in and transmitted from the conduit 10, 12 directly to the chamber P*i* and through the restriction R3 to each of the chambers P*n*, and the change in the pressure in the conduit 11, 13 transmitted to the pressure chamber P*na*.

As previously stated, the first deviation section A of Fig. 1 with its associated connections, forms a pressure and flow network for differentiating the error, or signal difference, between the pressures in the chambers P*s* and P*v*, while the second deviation section *a* and associated connections form a network for integrating the differential produced by the differentiating action of section A. In the operation of the apparatus shown in Fig. 1, the differentiating action of the section A is directly due to the rate responsive action of the restriction R3. As is mathematically demonstrable, the introduction of a rate responsive action into the operation of control apparatus of the general character illustrated in Fig. 1 results in a differentiating action. The positive feedback chamber P*o* of section A and the reset valve R1 and the interconnecting piping provide a reset operation, which is an integrating action.

A controller of the character shown in Fig. 1 should be suitable for any application that requires the use of the proportional-reset mode of control. It is to be noted also that a simple re-arrangement of the components in the control circuit will permit proportional, plus rate, plus reset response, in control air pressures, to changes in deviation between the process variable and set point pressures; or, in response to changes in any combination of the three terms.

As previously explained, the symbols P*o*, P*s*, P*v*, P*n*, P*i* and P*na*, represent the pressures per square inch in the corresponding chambers of the deviation units or sections A and *a* of Fig. 1. Other quantities or component values hereinafter taken into account in developing and explaining the operation of the apparatus shown in Fig. 1, are represented by the symbols *i*1, *i*2, *i*3, C*p*, C*n*, *r*1, *r*2, *r*3, and Z. The symbols *i*1, *i*2, and *i*3, represent the instantaneous flow rates through the conduits or pipes 6, 12, and 7, respectively. C*p* represents the lumped or total capacitance of the positive feedback chambers $Po$ of the deviation sections $A$ and $a$. $Cn$ represents the total capacity of the two negative feedback chambers $Pn$. The symbols $r1$, $r2$, and $r3$, represent the respective magnitudes of the resistances to flow of fluid through the different restrictions $R1$, $R2$ and $R3$. The symbol $Z$ represents the error or difference between the variable process pressure $Pv$, and the set point pressure $Ps$ sensed between the first deviation section $A$.

The relative values of the pressures in the different pressure chambers, and of the flow rates to be taken into account in explanation of the operation of the apparatus shown in Fig. 1, may be developed and determined by the use of the following theoretical rules or laws, 1, 2, and 3:

1. Ohm's law for electrical circuits may be applied to air flow through a needle valve or other capillary restriction by the use of the following equation, $$i=\frac{pd}{r} \quad (1)$$

where $i$ represents the rate at which air passes through a needle valve or other capillary restriction, and $pd$ represents the pressure drop or difference across the capillary restriction, and $r$ represents the magnitude of the resistance to air flow through the capillary restriction.

2. At any given instant of time the pressures transmitted to the negative feedback chambers through flapper-nozzle action, will maintain a balance of forces within the respective deviation sections $A$ and $a$.

3. The nozzle pressure required to achieve force balance within the respective deviation sections do not exceed the supply pressure.

The foregoing rule or law 1 is accurate when the pressure drop across each capillary restriction is small in comparison with the average level of the absolute pressure. The foregoing rule or law 2 will hold true when the air bleed rate through the nozzle D of the first deviation section of Fig. 1 is large compared to the parallel bleed rate through the restriction R3; and the bleed rate through the nozzle $d$ of the second deviation section is large compared to the parallel bleed rate through the restriction R2. The foregoing rule or law 3 is accurate when the nozzle pressures are not required to exceed the supply pressure to achieve force balance within their respective deviation sections.

In using the foregoing assumptions to determine the theoretical relationships between flows and pressures within the flow support shown in Fig. 1, the arrangement and relative sizes of the flexible portions of the different diaphragms 1—5 and 1a—5a are made such as to meet the requirements specified in the immediately following paragraphs $a$ and $b$.

$a$. The maintenance of force balance in the first deviation section at every given instant of time requires the relations specified in the following Equations 2, 3, and 4:

$$Pn = Po + Pv - Ps = Po + Z \quad (2)$$

or $$Pn - Po = Z \quad (3)$$

Hence $$\frac{dPn}{dt} = \frac{d(z+Po)}{dt} \quad (4)$$

where $Z$ represents the deviation or departure of the variable pressure $Pv$ from the point pressure $Ps$.

$b$. The maintenance of forced balance in the second deviation section in every instant of time requires the relations specified in the following Equations 5 and 6:

$$Pna = Po + Pi - Pn \quad (5)$$

or $$Pna - Po = Pi + Pn \quad (6)$$

The application of Ohm's law to the air currents $i1$, $i2$, and $i3$, respectively flowing through the restrictions R1, R2, and R3, which have resistances $r1$, $r2$, and $r3$, respectively, is set forth in the following Equations 7, 8, 9, and 10:

$$i3 = \frac{Pi - Pn}{r3} \quad (7)$$

or $$i3r3 = Pi - Pn \quad (8)$$

$$i2 = \frac{Pna - Po}{r2} \quad (9)$$

$$i1 = \frac{Pn - Po}{r1} \quad (10)$$

The rate at which pressure builds up in a chamber of a given volume is a direct function of the net flow or air into the chamber and an inverse function of the chamber's capacitance, and thus explains the following Equations 11, 12, 13, and 14:

$$\frac{dPn}{dt} = \frac{(i3-i1)}{Cn} \quad (11)$$

$$i3 = Cn\frac{dPn}{dt} + i1 \quad (12)$$

$$\frac{dPo}{dt} = \frac{i1+i2}{Cp} \quad (13)$$

Hence $$Po = \int \frac{(i1+i2)}{Cp} dt \quad (14)$$

$Cn$ and $Cp$ may be assumed to be constants when the changes in the pressures $Pn$ and $Po$ are small compared to the respective average absolute values of said pressures.

The above relations may be combined to form the following Equations 15, 16, 17, 18, 19, and 20:

$$i1 = \frac{Pn - Po}{r1} = \frac{Z}{r1} \quad (15)$$

$$i3 = Cn\frac{dPn}{dt} + i1 = Cn\frac{d(Po+z)}{dt} + \frac{z}{r1} \quad (16)$$

$$i2 = \frac{Pna - Po}{r2} = \frac{Pi - Pn}{r2} = \frac{i3r3}{r2} = \frac{r3}{r2}Cn\frac{d(Po+z)}{dt} + \frac{r3z}{r1r2} \quad (17)$$

$$Po = \int\frac{(i1+i2)}{Cp}dt = \frac{1}{Cp}\int\left[\frac{z}{r1} + \frac{r3}{r2}Cn\frac{d(Po+z)}{dt} + \frac{r3z}{r1r2}\right]dt = \frac{r2+r3}{Cpr1r2}\int zdt + \frac{Cnr3}{Cpr2}z + \frac{Cnr3}{Cpr2}Po \quad (18)$$

For $$m = \frac{r2}{r3} \text{ and } Cn = Cp$$

$$Po = \frac{1}{m-1}z + \left[\frac{m+1}{m-1}\right]\int\frac{zdt}{r1Cp} \quad (19)$$

and the pressure $Po$ may then be transmitted to a control valve H through the booster pilot valve G.

The foregoing Equation 18 is a general equation for the control air pressure developed by a controller of the type schematically disclosed in Fig. 1, and operating to provide the proportional-reset mode of control. The manner in which the relations developed by the different circuit components combine to produce the foregoing equation is diagrammatically illustrated in Fig. 2 in which the various symbols heretofore mentioned are utilized in designating the different components or elements of the combinations. It is noted that in Fig. 2, the various crossed blocks A$dd$, denote an adding device or effect. Examination of the Equation 18 for the control air pressure developed, shows that the proportional band PB of the unit (100÷coefficient of the Z term) may be expressed by the following equation:

$$PB = 100\left(\frac{r2}{r3} - 1\right)\% \tag{20}$$

Thus, the proportional response of the unit will not be influenced by the setting of the reset needle valve R1; and the proportional band PB may be varied from ∞ (when $r2 = \infty$) to 0 (when $r2 = r3$). However, it can be seen that the coefficient of the $zdt$ term (as well as the $z$ term) will be influenced by the setting of the proportional band needle valve R2. Proper adjustment of the reset needle valve R1, however, should permit any desired reset response at any given setting of the needle valve R2. It is interesting to note that with proportional response cut-off (i. e., when $r2 = \infty$) the equation for control air pressure reduces to $$Po = \frac{1}{r1Cp}\int zdt \tag{21}$$

which is the equation for a proportional speed floating controller.

It is believed that the principle and general operation of the invention will be apparent from the foregoing description and explanations. In the ordinary use of the invention shown in Fig. 1, the immediate effect of an increase or decrease in the pressure $Pv$ is a movement of the rod B which increases or decreases the bleed pressure in the nozzle D, and thereby increases or decreases the pressures in the two negative feedback chambers $Pn$ and in the chamber $Pi$. The changes in the pressure $Pi$ and in the negative feedback chamber $Pn$ of the deviation section $a$, results in a movement of the rod or shaft $b$ which increases or decreases the bleed pressure in the nozzle $d$ and thereby increases or decreases the pressure in the chamber $Pna$.

The booster pilot section F with the non-bleed pilot G in the feedback circuit, avoids unsatisfactory performance experienced when a high capacity, non-bleed pilot valve of the type illustrated and described, operates alone (i. e., "open looped") as an isolation or gain relay. In such cases, hysteresis and "drift" are evident to a considerable degree in the response in output pressure to changes in the pressure applied to the input chamber of the pilot valve. However, the arrangement illustrated in the booster pilot valve section F of Fig. 3 is designed to correct this condition in that it permits the inclusion of a high gain flapper-nozzle detection system in series in the pilot. Thus the pressure developed at the output of the pilot, i. e., the pressure transmitted to the control element H, is made extremely sensitive to variations in pressure developed in the positive feedback chambers of deviation sections A and $a$.

It is to be noted that the sizing of the passage through the restriction element R3, or more accurately, the magnitude of the resistance to air flow through the restriction R3, may be varied as the conditions of controller application make desirable. The free communication between the two positive feedback chambers $Po$ of the deviation sections A and $a$ insures that the pressure level in the first deviation section will not become equal to the supply pressure before the output pressure from the second deviation section $a$ reaches its full scale value. The latter may be assumed to be about 15 p. s. i. A further desirable effect of free communication between the two positive feedback chambers is the provision of an additional gain stage through regenerative feedback action. It is further to be noted, that in a case in which the error signal developed across the resistance R3 becomes too weak to be sensed by the deviation section $a$, the control air pressure will continue to vary through reset action in the first deviation section until the process variable "floats in" to the control point.

Proportional plus reset and plus rate control in response to changes in the quantity Z, may be included in the pressure developed in the second deviation section $a$; whereby when $$m = \frac{r2}{r3}, \text{ and } Cn = Cp$$

$$Pna = \left[\frac{r2Cp}{m-1}\right]\frac{dz}{dt} + \frac{r1+2(r2)}{r1(m-1)}z + \frac{(m+1)}{(m-1)r1Cp}\int zdt \tag{22}$$

Thus, for three-term control, the pressure $Pna$ may be transmitted through a booster pilot to an ultimate control valve. If the resistance R3 is a needle valve restriction, the coefficient of the $$\frac{dz}{dt}, z, \int zdt$$

terms may be adjusted to their desired values.

Figure 2:
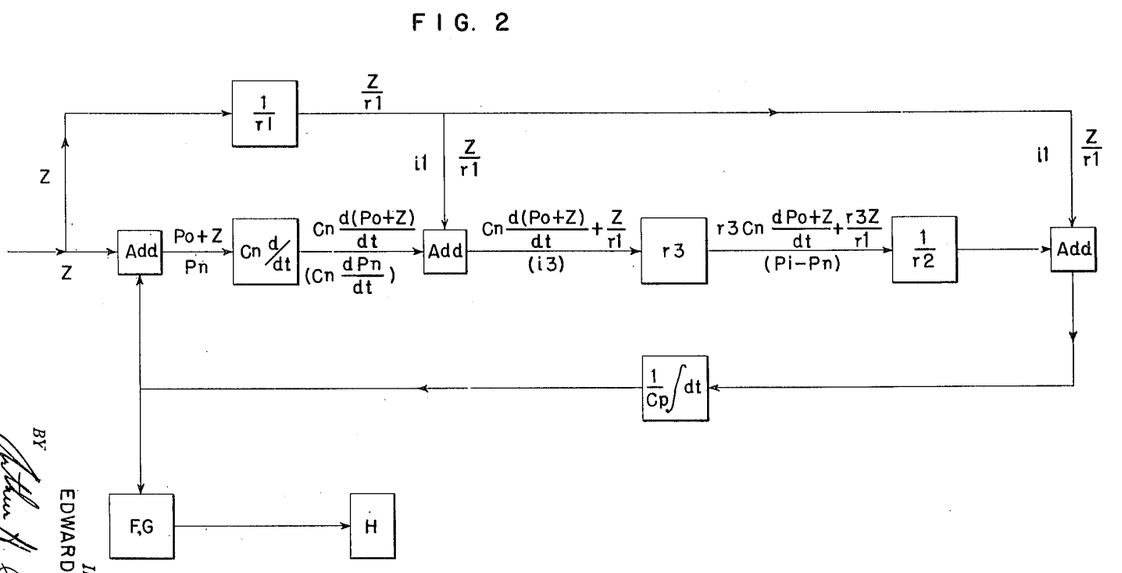
Fig. 2 is a block diagram illustrating the manner in which the elements of the controller illustrated in Fig. 1 cooperate in developing the preasures and pressure relations used in obtaining the desired control action.

In Fig. 3 I have illustrated, somewhat diagrammatically, a stack type instrument structure Q adapted for operation in the manner illustrated in Fig. 1 and in Fig. 2. The stack structure comprises rigid, hollow, circular bodies arranged end to end, and flexible wall or diaphragm members having their peripheral portions clamped between the ends of adjacent rigid stack elements. The arrangement shown in Fig. 3 differs from that shown in Fig. 1 in that each of the flexible walls forming one side wall of a pressure chamber, is interposed between that chamber and a chamber $Atm$, which is open to the atmosphere. In the particular arrangement shown in Fig. 3, the pressure chambers $Pn$, $Pv$, $Ps$, and $Po$, extending in the order stated downward from the top of the structure Q, constitute the four pressure chambers of the first deviation section A. The chamber $Po$ at the bottom of the section A also forms the top portion of the deviation section $a$. The remaining pressure chambers $Pn$, $Pi$, and $Pna$ of the section $a$ are relatively arranged as shown in Fig. 1. The four lower chambers of the stack unit are collectively analogous to the booster-pilot section and pilot valve chambers $Po''$, $Po'$, $g'$, and $ga'$.

Conduits $Ps'$ and $Pv'$ are connected to the pressure chambers $Ps$ and $Pv$, respectively, of Fig. 3. Conduits 6', 7', 9', 10', 11', 12', 13', 14', 15', 16', and 17'; and restrictions R1, R2, R3, R4, R5, and R6 are associated with the chambers $Po$, $Pn$, $Pi$, $Pna$, $Po'$, $Po''$, $g'$, and $ga'$ of Fig. 3, in a manner generally similar or analogous to that in which the conduits 6, 7, and 9–17, are associated with the corresponding chambers of Fig. 3. Restrictions R1—R6 are respectively associated with the chambers $Po$, $Pi$, $Pna$, $Po'$, $Po''$, $g$ and $ga$ of Fig. 1. The flexible chamber walls of the deviation section A are connected by a central shaft or rod B', which cooperates with a flapper valve E' to control the outflow of air through the bleeder nozzle D'. The latter differs from the nozzle D of Fig. 1 only in that it is located within one of the stack chambers $Atm$ in free communication with the atmosphere. The flexible walls of the second deviation section $a$, are connected by a central shaft or rod $b'$ which moves in response to variations in the resultant of the pressures in the corresponding pressure chambers, between a lower position in which it closes, and an upper position in which it opens a vent or bleeder outlet $d'$ from the negative feedback chamber $Pna$ at the bottom of the deviation section.

A central rod or shaft $bb'$ connected to the three uppermost flexible wall elements of the booster-pilot valve section FG of Fig. 3 controls a vent $Da'$ opening from the subjacent pressure chamber $g'$ to an adjacent atmospheric pressure chamber $Atm$. The two lower flexible wall members of the valve section FG of the stack assembly, are connected to a tubular valve member 20. The latter is formed with a central passage 21 which is closed at its upper end and is open at its lower end, and is also formed with lateral vents 22 opening to the atmospheric pressure chamber $Atm$ between the chambers g' and g". The lower end of the valve member 20 extends loosely through an opening 23 in the top wall of a valve chamber 24. As shown, the chamber 24 is formed in the bottom end wall section of the stack assembly unit Q and is connected by conduit sections 16' and 11' to the main air supply source C. A ball valve 25 within but not filling the chamber 24, is spring biased for movement into engagement with the lower end of the top wall opening 23 of the chamber 24, so as to thereby prevent the passage of air out of the chamber 24 to the atmosphere through the passage 23. As shown, the area of the flexible bottom wall of the chamber g' is substantially greater than the area of the flexible top wall of the chamber ga'. The chambers ga' and Po" are in free communication through a conduit 26.

The booster-pilot section is in effect an additional relay section with a non-bleed pilot in the feedback circuit. High capacity non-bleed pilots of the type illustrated in Fig. 1 do not give satisfactory performance when operating alone (i. e., "open looped") as isolation or gain relays. Hysteresis and "drift" are evident to a considerable degree in the response in output pressure to changes in the pressure applied to the input chamber of the pilot. However, the arrangement illustrated in the booster-pilot section of Fig. 3 is designed to correct this condition in that it permits the inclusion of a high gain, flapper-nozzle detection system in series in the pilot. Thus the pressure developed at the output 17' of the pilot (i. e., the pressure transmitted to a control element) is made extremely sensitive to variations in pressure developed in the positive feedback chamber Po which is common to the deviation sections A and a of Fig. 3.

In the operation of the controller comprising the two deviation units A and a, the effect of the second deviation unit a is to create an output pressure Po which is proportional in magnitude to the variable pressure Pv under measurement. Pressure Pv forms the input to chamber Pv of the first deviation unit. The output pressure Po of the second deviation unit is applied by the connection 8 to the positive feedback chamber Po of the first deviation section A for the purpose of regulating the effective follow-up action on the rod B of a change in pressure in the negative feedback chamber Pn. A particularly important feature of the arrangement is the provision of the adjustable restriction R2 which connects the negative (Pna) and positive feedback chambers (Po) of the second deviation section a and permits adjustment in the magnitude of the said output pressure of the second deviation unit and thereby permits variation in the extent of follow-up action produced by a change in pressure in the negative feedback pressure chamber Pn of the first deviation section. Thus, adjustment of the restriction R2 provides a proportional band or throttling range adjustment of the controller collectively formed by the deviation sections A and a.

Let it be assumed that the adjustable reset restriction R1 is closed. This restriction is in the connection 6 between the negative feedback chamber Pn and the positive feedback chamber Po of the deviation unit A. Proceeding on this assumption, on a change in the measured variable pressure applied to the chamber Pv, the deviation section A operates initially to produce a pressure in the nozzle D which is comprised of a component proportional to the magnitude of the variable measured pressure and a component proportional to the rate of change of the measured variable pressure. That pressure is applied directly by connection 12 to the pressure chamber designated Pi of the deviation section a. The pressure in the negative feedback chamber Pn of deviation section A, proportional to the measured variable pressure, is applied by the connection 9 to the chamber Pn of deviation section a. It will be noted that the pressures in chambers Pi and Pn apply opposing forces to the rod b, and as those skilled in the art will readily understand, the resultant force which is so applied to the rod b is representative only of the rate of change of the measured variable pressure. In other words, there exists in each of the chambers Pi and Pn a pressure proportional to the measured variable pressure and since those pressures are opposed, they effectively cancel each other, leaving only the rate component of pressure in the chamber Pi effective to act on the rod b.

The motion of the rod b resulting from the application of the rate component of pressure in the chamber Pi is effective to cause a change in the pressure in the nozzle d of deviation unit a, and that nozzle pressure change is applied by connection 13 to the negative feedback chamber Pna. The pressure change so produced in chamber Pna provides a follow-up or balancing adjustment tending to restore the rod b to its initial position. In other words, the change in pressure in chamber Pna is in the direction opposing the rate component of pressure in the chamber Pi.

By virtue of the connection 7 including the adjustable restriction R2 between the negative feedback chamber Pna and the positive feedback chamber Po, the deviation unit a operates effectively to integrate the rate component of pressure existing in the chamber Pi. Such integrating action thus produces in chamber Po a pressure which is proportional to the component of pressure in the chamber Pi which is representative of the measured variable pressure Pv. It can be demonstrated that, by adjustment of the size of the restriction R2, the magnitude of the pressure produced in the chamber Po can be varied at will over a wide operating range, specifically, from zero to the pressure of the supply source connected to the conduit C.

As shown, the chamber Po of the deviation unit a is connected by connection 8 to the chamber having the same reference character (Po) of the deviation section A. With chambers in the deviation section a of suitable volume in relation to the size of the restriction R2, there is at most only a small time delay between the application of a change in the measured variable pressure in chamber Pv of unit A before that change in pressure is felt in the positive feedback chamber Po. Analysis of the arrangement of deviation unit A shows that the effect of applying a pressure in the chamber Po which is proportional to the measured variable pressure is to regulate the effective negative follow-up or balancing action on the rod B of a change in pressure in the negative feedback chamber Pn. Moreover, the extent of such regulation is adjustable by manipulation of the restriction R2. Such regulation in the effective balancing action produced by a change in pressure in the negative feedback chamber Pn is known as a proportional band or throttling range adjustment. Accordingly, adjustment of restriction R2 permits a desirable adjustment of the proportional band or throttling range of the controller actuated by elastic fluid pressure as described. Furthermore, the cooperation of the two deviation units A and a is such that the proportional band or throttling range may be adjusted over a wide range from zero to infinity.

In the foregoing explanation, it has been assumed that the adjustable reset restriction R1 in the connection 6 between the negative and positive feedback chambers of the deviation unit A has been closed. When restriction R1 is closed, the elastic fluid actuated controller described produces no reset action. When restriction R1 is opened to permit a regulated flow of elastic fluid between the negative and positive feedback pressure chambers Pn and Po, the operation of the apparatus is similar to that stated in the foregoing explanation, except that the resultant force acting on the rod B of deviation unit A includes a component proportional to the magnitude of the measured variable pressure in addition to a component proportional to the rate of change of the measured variable pressure.

As those skilled in the art understand, the action of the deviation unit a in integrating the proportional component of pressure is to produce in the positive feedback chamber Po a reset pressure component. Thus, with the restriction R1 open a selected amount, the pressure in the positive feedback chamber Po is made up of a component proportional to the magnitude of the measured variable pressure and the reset pressure component. Those two components of pressure are applied by the connections 8 and 14 and by the one-to-one relay F to the pilot valve regulator G, and accordingly, control the final valve or other actuated element H.

Figure 4:
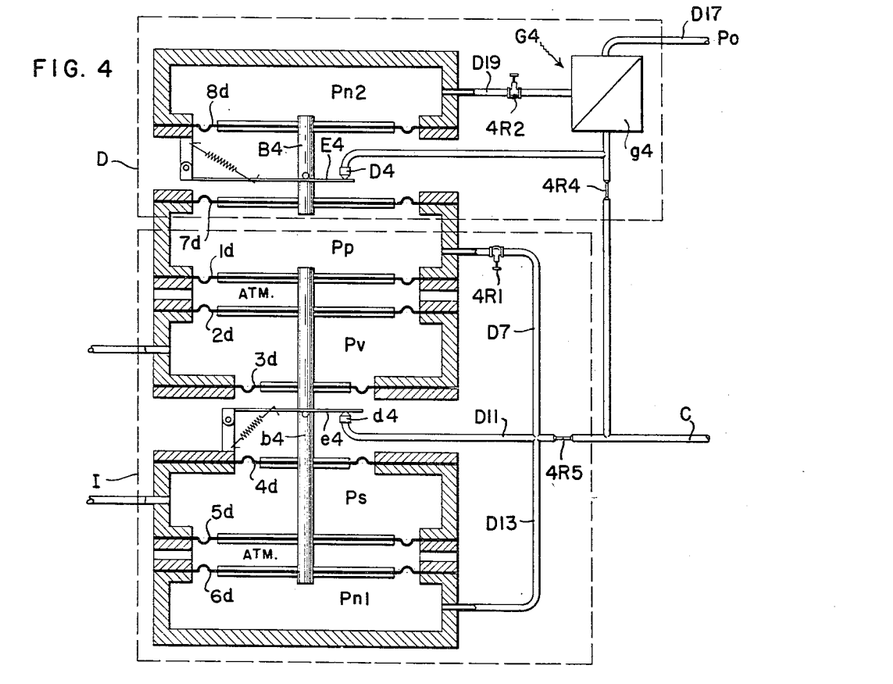
Fig. 4 is a schematic diagram of a modification.
Figure 5:
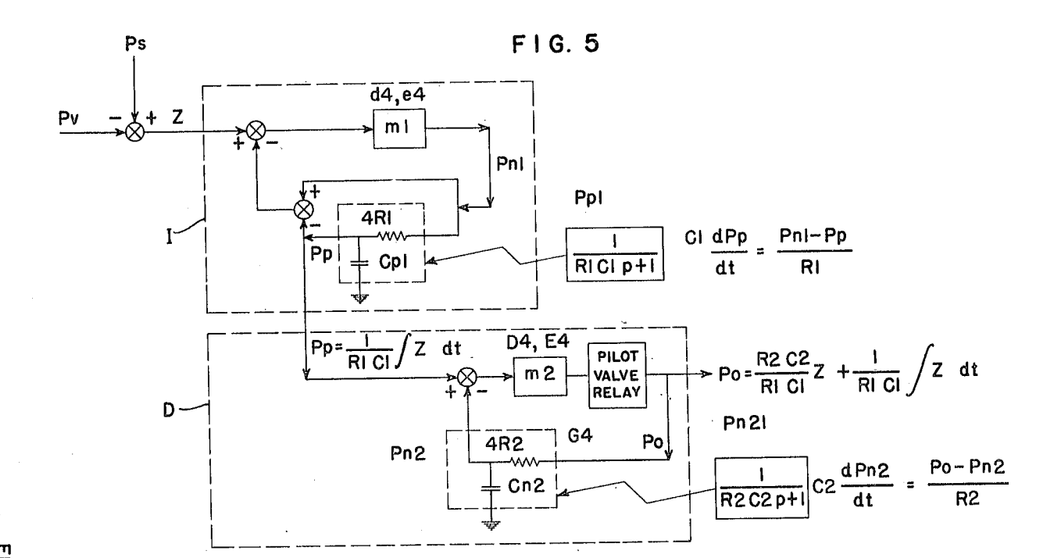
Fig. 5 is a block diagram of the modification of Fig. 4.
Figure 6:
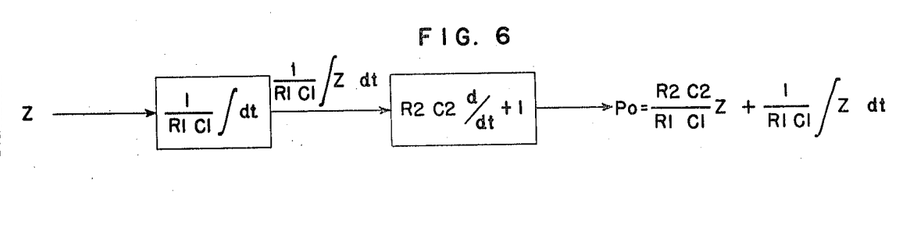
Fig. 6 is a block diagram showing the mathematical relationships of the parts of the modification shown in Fig. 4.

*Modification of Figs. 4, 5, and 6*

In this modification the error signal is transmitted through an integrating stage ahead of, and in series with, a proportional band plus rate stage. In the device shown in Fig. 4, air from supply pipe C passes through restriction 4R5 to a nozzle $d4$. The integrating stage comprises the chambers and their associated connections enclosed within the dotted line designated by the reference character I. This integrating stage I comprises the chambers $Pp$, $Pv$, $Ps$ and $Pn1$. Chamber $Pp$ is the positive feedback chamber and has a capacity $Cp1$. Chamber $Pn1$ is a negative feedback chamber and has a capacity $Cn1$. Chambers $Pp$ and $Pv$ are separated by two diaphragms defining between them a chamber open to atmosphere and marked ATM. Chambers $Ps$ and $Pn1$ are separated by two diaphragms defining between them a chamber open to atmosphere and marked ATM. The flexible diaphragms $1d$, $2d$, $3d$, $4d$, $5d$, and $6d$ are each connected at its stationary peripheral portion to the corresponding cylinder wall and each has a movable central portion connected by an intermediate flexible portion to the cylinder. The central portion of each of the flexible diaphragms $1d$–$6d$ is connected to a vertically extending rod or shaft $b4$. Rod or shaft $b4$ actuates a flapper $e4$ which is biased into the position in which it closes the bleed outlet of the nozzle $d4$. Normally, the valve $e4$ is displaced more or less from the nozzle $d4$ by the valve actuating rod $b4$. The chamber $Pn1$ is connected under the control of nozzle $d4$ by pipes D11 and D13. Chamber $Pp$ is connected to nozzle $d4$ by pipes D11 and D7 containing a manually adjustable restriction 4R1 which forms the proportional band adjustment.

The proportional band plus rate stage, which performs the differentiation, is formed by the chambers and diaphragms and their associated connections enclosed within the dotted line marked with the reference character D. These are the diaphragm $7d$, which forms the upper, flexible wall of the chamber $Pp$, and the diaphragm $8d$, which forms the lower, flexible wall of the chamber $Pn2$, which is the negative feedback chamber and which has a capacity $Cn2$. The diaphragms $7d$ and $8d$ are connected by a valve-actuating shaft or rod B4 which actuates a flapper E4 relative to a nozzle D4. Nozzle D4 receives air from supply pipe C through supply restriction 4R4. Nozzle D4 is connected to the motor chamber $g4$ of a pilot valve or relay G4 having an outlet pipe D17 through which the output pressure (Po) is fed to another controller or directly to a final control element, such as an air-operated valve. The output of pilot valve or relay G4 also passes through a pipe D19 containing a restriction 4R2 which forms the proportional band and reset adjustment. Pipe D19 is connected at its opposite end to the second negative feedback chamber $Pn2$.

Fig. 5 illustrates the manner in which the elements of the controller shown in Fig. 4 combine to produce an output pressure response (Po) that is a proportional plus integral function of the input error signal (Z) i. e. the deviation between the set point pressure Ps and the controlled or process variable pressure Pv. This controller forms a pressure-fluid network which should permit a theoretical range in proportional band settings from zero to infinity. A unique feature of this modification is that magnification of the controller dead spot (causing a "droop" between process variable and set point with excessive system load changes) should not result at the wide range settings of the controller. Fig. 5 is a block diagram which shows that the pressure Pv is applied in opposition to Ps. Any difference between these pressures produces an error signal Z. This error signal (combined with a negative feedback pressure) is amplified in the ratio $m1$ by means of the flapper valve combination $d4$, $e4$ to produce the amplified pressure $Pn1$. Pressure $Pn1$ is split. One portion of this pressure is fed back to oppose the error signal Z. The other portion is fed through restriction 4R1 to chamber $Pp$ which has a capacity $Cp1$. Block $Pp1$ shows the mathematical representation of the transformation which takes place in the chamber $Pp$. The pressure $Pp$ is also applied to the flapper and valve combination D4, E4, which gives it a magnification $m2$. The output of the flapper-nozzle combination is fed to the pilot valve relay G4 where it produces the output pressure Po. The mathematical representation of the components of the output pressure Po is given. Pressure Po is split. A portion of pressure Po is fed back to chamber $Pn2$ which has resistance 4R2 and capacity $Cn2$. The separate block $Pn21$ shows the mathematical representation of the effects applied to the pressure in chamber $Pn$.

Fig. 6 is a diagrammatic showing of a mathematical equation of the way in which the error signal Z is made up of the pressures, resistances, and capacitances referred to in Figs. 4 and 5.

*Modification of Figs. 7, 8, 9, and 10*

Figure 7:
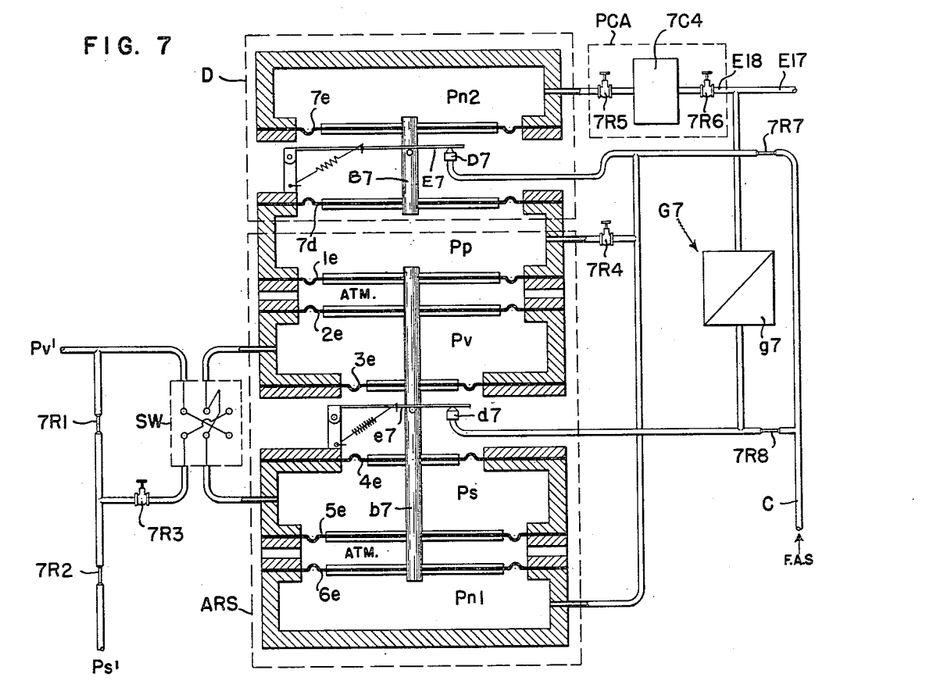
Fig. 7 is a schematic diagram of another modification.

Fig. 7 shows a controller in which the pressure proportional to the instantaneous value of the process or measured variable is supplied to the controller through a pipe $Pv'$. A pressure proportional to that value of the measured variable (which it is desired to have the controller maintain) is fed to the controller through pipe $Ps'$. $Pv'$ and $Ps'$ lead to the controller through a switching arrangement SW, by means of which, the chambers, to which the measured variable pressure Pv and the set point pressure Ps are applied, can be reversed. Switching arrangement SW consists of a valve having a stationary part and a movable part together with cooperating ports which operate together after the manner of a double-pole, double-throw, electric switch. The controller has an automatic reset stage which comprises those parts enclosed within the dotted lines designated by the reference character ARS. The controller also has a proportional band plus rate stage which comprises the parts enclosed within the dotted lines designated by the reference character D. The automatic reset stage ARS comprises the chambers $Pp$, $Pv$, $Ps$, and $Pn1$. By operation of the switch SW the functions of the chambers Pv and Ps can be reversed. Chambers $Pp$ and $Pv$ are separated by two diaphragms defining between them a chamber open to atmosphere and marked ATM. Chambers Ps and $Pn1$ are separated by two diaphragms defining between them a chamber open to atmosphere and marked ATM. Each of the flexible diaphragms $1e$, $2e$, $3e$, $4e$, $5e$, and $6e$ is connected at its stationary peripheral portion to the corresponding cylinder wall and each has a movable central portion connected by an intermediate flexible portion to the cylinder. The central portion of each of the flexible diaphragms $1e$–$6e$ is connected to a vertically extending rod or shaft $b7$. Rod or shaft $b7$ operates a flapper $e7$ which is biased into the position in which it closes the bleed outlet of a nozzle $d7$. Normally, the valve $e7$ is displaced more or less from the nozzle $d7$ by the valve actuating rod $b7$.

This controller permits immediate response in control air pressure Po to changes in measured or process variable pressure Pv. This is due to a pressure divided-delay pneumatic circuit connected between the process variable connection $Pv'$ and the set point pressure connection $Ps'$. This pressure divider-delay circuit comprises a restriction 7R1 and a second restriction 7R2 connected in series between the process variable connection $Pv'$ and the set point connection $Ps'$. At the junction of the restrictions 7R1 and 7R2 is connected a third restriction 7R3 which comprises a start-up lead time adjustment. The output of the variable restriction 7R3 leads to one inlet connection to switch SW.

Air is supplied from pipe C through a nozzle restriction 7R8 to the nozzle $d7$. Air under the control of this nozzle is fed to the motor chamber $g7$ of a pilot valve or relay, generally indicated by the reference character G7. The output of pilot valve or relay G7 is the output or control air pressure Po and is conducted by a pipe E17 to an air-operated final control valve or to another controller.

A pipe E18 branches from pipe E17 and forms the input to a circuit which provides means for adjusting the controller to the characteristics of the process under control. This means comprises the parts located within the dotted lines designated by the reference character PCA. These comprise adjustable needle valves or other restrictions 7R5 and 7R6 separated by a closed chamber whose capacity is designated as 7C4. The output from restriction 7R5 is led to chamber $Pn2$ which has a capacity 7C3.

Figure 8:
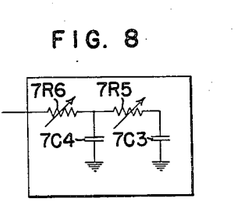
Fig. 8 is a block diagram of a portion of the controller shown in Fig. 7.

Fig. 8 is a diagram showing the analog of the process characteristic adjustments to electrical resistances and capacitances.

The proportional band plus rate stage, designated generally by the reference character D, performs the differentiation. This stage is formed by the diaphragm $7d$, which forms the upper flexible wall of the chamber $Pp$, and the diaphragm $7e$, which forms a lower, flexible wall of the chamber $Pn2$, which is the negative feedback chamber and which has a capacity 7C3. The diaphragms $7e$ and $7d$ are connected by a valve-actuating shaft or rod B7 which actuates a flapper valve E7 relative to a nozzle D7. Nozzle D7 receives air from supply pipe C through supply restriction 7R7. Nozzle D7 is connected to chamber $Pp$ through manually adjustable restriction 7R4 which provides an automatic reset time adjustment. Nozzle D7 is directly connected to negative feedback chamber $Pn1$.

The operation of this modification is as follows. Assume that the pressure in chamber $Pv$ increases due to a variation in the process or measured variable. The consequent, upward movement of the diaphragm $2e$ causes rod or shaft $b7$ to lift flapper $e7$ relative to nozzle $d7$. The pressure in nozzle $d7$ and in the motor chamber $g7$ of pilot valve or relay G7 decreases as a result. The pressure in the pipe E17, which is the output of pilot valve or relay G7, is correspondingly reduced. Since pipe E18 branches from pipe E17, the pressure in pipe E18, which is applied to the differentiating means PCA, is also reduced.

The pressure in pipes E17 and E18 contains: (1) a component proportional to the error signal, i. e. the difference between $Pv$, the instantaneous value of the measured variable and $Ps$, that value of the measured variable which it is desired to maintain; (2) a component which is a function of the time-integral of the error signal. This is also called the reset mode of operation of the controller; (3) a component which is a function of the first time-differential of the error signal. This is also called the rate mode of operation of the controller. This reduction in pressure in pipe E18 causes a flow of fluid from chamber $Pn2$ through restriction 7R5, capacity 7C4, and resistance 7R6. The flow through capacity 7C4 and restriction 7R6 is proportional to the time-differential or rate mode of operation of the controller. Therefore, the time-differential component is removed from the pressure in chamber 7C4 so that the pressure in chamber 7C4 contains only the proportional plus the integral components.

The flow through restriction 7R5 and capacity of chamber $Pn2$ is proportional to the proportional component. Therefore, the proportional component is removed from the pressure in chamber $Pn2$ so that the pressure in chamber $Pn2$ contains only the integral component. This consequent reduction in pressure in chamber $Pn2$ causes rod or shaft B7 to move flapper E7 away from nozzle D7 and thereby reduces the pressure in the pipe connected to this nozzle. The pressure in the pipe connected to nozzle D7 contains the proportional plus integral components. This reduction in the pressure in the pipe connected to nozzle D7 is applied immediately to negative feedback chamber $Pn1$. A reduction in pressure in chamber $Pn1$ causes negative feedback because diaphragm $6e$ is moved down, thereby causing rod or shaft $b7$ to move flapper $e7$ toward nozzle $d7$. This is the opposite direction to that in which flapper $e7$ was moved by the increase in pressure in chamber $Pv$.

The decrease in pressure in nozzle D7, simultaneously with its application to negative feedback chamber $Pn1$, starts a flow through restriction 7R4 from positive feedback chamber $Pp$. This flow through restriction 7R4 removes the proportional component and leaves only the time-integral component in the pressure in chamber $Pp$.

This reduction in pressure in chamber $Pp$ gives positive feedback to rod or shaft $b7$ because diaphragm $1e$ moves up or in the same direction as that direction in which it was moved by the increase in pressure in chamber $Pv$. Since the pressure in chamber $Pn1$ contains both the proportional and the integral components, while the pressure in chamber $Pp$ contains only the integral component, and since the pressures in chambers $Pn1$ and $Pp$ operate in opposite directions, the integral component is cancelled and only the proportional component is applied through rod or shaft $b7$ to flapper $e7$. This proportional component applies a force to flapper $e7$ which is equal but opposite in direction to the force applied to flapper $e7$ as a result of the error signal.

At the same time, this decrease in pressure in chamber $Pp$ gives negative feedback to rod or shaft B7 because diaphragm $7d$ moves down thereby causing rod B7 to move flapper E7 towards nozzle D7 or in the direction opposite to the direction in which flapper E7 was moved by the reduction in pressure in chamber $Pn2$.

A decrease in the pressure applied to chamber $Pv$, as a consequence of a change in the process or measured variable in the opposite direction to that just described, will obviously cause each of the movements just described to be reverse but will cause the positive and negative feedback chambers to operate so as to assist or oppose, respectively, the movements of the flapper-actuating rods caused by the change in the process or measured variable.

Figure 9:
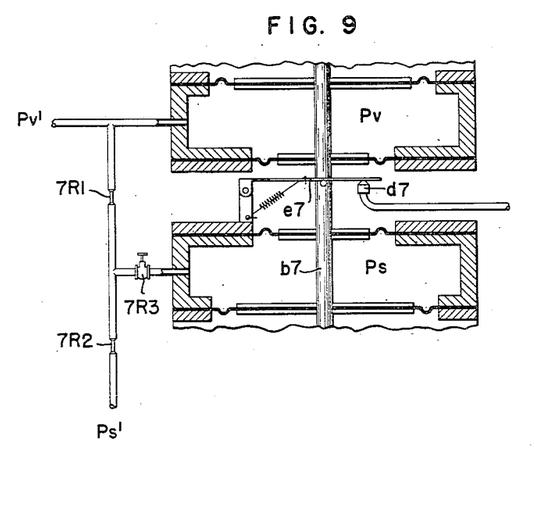
Fig. 9 is a schematic diagram of a portion of a controller according to the modification of Fig. 7 omitting the switch.

Fig. 9 shows that the process variable connection $Pv'$ may be connected directly to the chamber $Pv$ and the output of restriction 7R3 can be connected directly to the chamber $Ps$. When this is done, the switch SW is omitted. This drawing illustrates the connections for reverse action of the controller.

Figure 10:
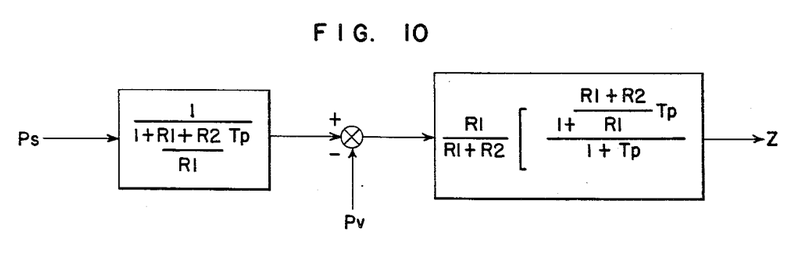
Fig. 10 is a block diagram showing the mathematical relationships of the parts of the modification shown in Fig. 7.

Fig. 10 (Sheet 4) is a block diagram of the pressure divider-delay circuit comprising the resistances 7R1, 7R2, and 7R3. The transfer functions appearing in Fig. 10 are based on the assumption that the capacity 7C1 of the chamber $Pv$ or $Ps$ is very small in value. Therefore, for any appreciable delay in modified set point pressure, resistance 7R3 is very much greater than 7R1 or 7R2. The pressure divider-delay circuit gives desired start-up characteristics and recovery of the measured variable to the control point without "overshooting" of the control point. In effect, the component of control air pressure (Po) that opposes the effect of the system lag for optimum control is derived from the inclusion of the process characteristic adjustments (PCA). These provide a pneumatic analogue of the dominant process characteristics in the feedback of a "stiff" circuit. The automatic reset time adjustment 7R4 governs the rate at which the measured variable is permitted to return to some desired set or control point when the system has been disturbed.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent is as follows:

1. An elastic-fluid-pressure-actuated controller, including, means to derive a process variable force proportional to the deviation of a process variable from a predetermined value, means responsive to said process variable force to create a second force containing a component proportional to said process variable, means responsive to said second force to create a third force containing a component proportional to said process variable plus the derivative of said deviation with respect to time, means to oppose said second force and said third force to each other to create a fourth force proportional to said derivative of said deviation with respect to time, means to integrate said fourth force proportional to the derivative of said deviation with respect to time so as to create a fifth force proportional to said deviation, and means to oppose said process variable force and said fifth force to said third force to produce an output force which is the resultant of said forces.

2. An elastic fluid pressure actuated controller, including, means to create a process variable force proportional to the deviation of a process variable from a predetermined value, means responsive to said process variable force to create a second force proportional to said deviation, means responsive to said second force to create a negative feedback force proportional to said deviation plus the derivative of said deviation with respect to time, means in which said negative feedback force and said second force cooperate to produce a third force proportional to the derivative to said deviation with respect to time, means creating an elastic fluid pressure flow proportional to the derivative of said deviation with respect to time, manually adjustable means for integrating said flow to create a fourth force proportional to said deviation, and means in which said process variable force and said fourth force oppose said negative feedback force to create an output which is proportional to the resultant of said forces.

3. An elastic fluid pressure actuated controller, including, means to create a process variable force proportional to the deviation of a process variable from a predetermined value, means responsive to said process variable force to create a second force proportional ot said process variable force, means to create a negative feedback force proportional to said process variable force plus the derivative of said deviation with respect to time, means to oppose said negative feedback force and said second force to create a third force proportional to said derivative of said deviation with respect to time, means to integrate said third force proportional to the derivative of said deviation with respect to time so as to create a fourth force proportional to said deviation, and means to apply said process variable force and said fourth force in opposition to said negative feedback force to produce an output force which is the resultant of said forces.

4. An elastic fluid pressure actuated controller, including, a first deviation section comprising a first positive feedback pressure chamber, a process variable pressure chamber, a set point pressure chamber, and a first negative feedback pressure chamber, and a second deviation section comprising a second positive feedback pressure chamber, a second negative feedback pressure chamber, an input pressure chamber, and a negative feedback pressure amplified chamber, means responsive to the resultant of the pressures in first four pressure chambers regulating the pressure in said input chamber, means depending on the resultant of the pressures in the second deviation section for supplying elastic fluid under regulable pressure to the negative feedback pressure amplified chamber of the second deviation section, means responsive to variations in the resultant of the pressures in the pressure chambers of the first deviation section and of the second deviation section, means connecting the positive feedback pressure chambers, and means for varying the pressure of elastic fluid from a source of elastic fluid under pressure and operated by said means depending on the last mentioned resultants.

5. An elastic fluid pressure actuated controller, including, a first deviation section comprising a first positive feedback pressure chamber, a set point pressure chamber, a process variable pressure chamber, and a first negative feedback pressure chamber, and a second deviation section comprising a second positive feedback pressure chamber, a second negative feedback pressure chamber, an input pressure chamber, and a negative feedback pressure modified chamber, means for transmitting to the second deviation section an input signal which is a function of the rate of change of the pressure developed in the first negative feedback chamber which pressure is required to counteract the effects of the pressure changes in the process variable pressure chamber and the set point pressure chamber and the first positive feedback pressure chamber, means depending on the resultant of the pressures in the second deviation section supplying elastic fluid under regulable pressure to the negative feedback pressure modified chamber, and means connecting the positive feedback pressure chambers to a means for varying the pressure of elastic fluid from a source of elastic fluid under pressure and operating said last mentioned means in accordance with the resultant of the pressures in said sections.

6. An elastic fluid pressure actuated controller, including, a first deviation section comprising a first positive feedback pressure chamber, a set point pressure chamber, a process variable pressure chamber, and a first negative feedback pressure chamber, and a second deviation section comprising a second positive feedback pressure chamber, a second negative feedback pressure chamber, an input pressure chamber, and a negative feedback pressure modified chamber, means responsive to the resultant of the pressures in the first four chambers regulating the pressure in said input chamber, means connected to the pressure in said input chamber and to said first and second negative feedback pressure chambers and introducing into the pressure in said input chamber a pressure component proportional to the derivative of the difference between the pressures in said process variable pressure chamber and said set point pressure chamber and said first positive feedback pressure chamber, means depending on the resultant of the pressures in the second four pressure chambers supplying elastic fluid under regulable pressure to the negative feedback pressure modified chamber, means connecting the negative feedback pressure modified chamber to the second positive feedback pressure chamber, means integrating the flow of fluid between said chambers to provide in said first and second positive feedback pressure chambers a pressure component proportional to the difference between the pressures in said second negative feedback pressure chamber and said input chamber, means connecting said first and said second positive feedback pressure chambers to a booster pilot section having an operating chamber and a negative feedback chamber, and means connecting the output of the booster pilot section to the negative feedback chamber of said booster pilot section.

7. A controller actuated by the pressure of an elastic fluid, including, a first deviation section comprising a first positive feedback chamber, a set point chamber, a process variable chamber, and a first negative feedback chamber, and a second deviation section comprising a second positive feedback chamber, a second negative feedback chamber, an input chamber, and a negative feedback pressure modified chamber, a valve responsive to the resultant of the pressures in the first four chambers and regulating a pressure, means connecting the pressure regulated by said valve to said input chamber, a first restriction connected between the pressure regulated by said first valve and said first and said second negative feedback chambers and having a capacity for fluid flow less than that of said first valve, a second valve responsive to the resultant of the pressures in said second deviation section and regulating a pressure, a connection between the pressure regulated by said second valve and said negative feedback pressure modified chamber, a second restriction between said negative feedback pressure modified chamber and said second positive feedback chamber and having a capacity for fluid flow less than that of said second valve, a connection between said first and second positive feedback pressure chambers, and a connection for the output pressure of said controller from said first and second positive feedback chambers.

8. An elastic fluid pressure actuated controller, including, a first deviation section comprising a first positive feedback pressure chamber, a set point pressure chamber, a process variable pressure chamber, and a first negative feedback pressure chamber, and a second deviation section comprising a second positive feedback pressure chamber, a second negative feedback pressure chamber, an input pressure chamber, and a negative feedback pressure amplified chamber, means responsive to the resultant of the pressures in said first deviation section and varying the pressure of the fluid from a source of fluid pressure, means introducing into the fluid pressure from said source a pressure component proportional to the derivative with respect to time of the difference between the pressures in said process variable pressure chamber and said set point pressure chamber and said first positive feedback pressure chamber, means integrating said pressure containing a component proportional to the derivative of said deviation and to produce a pressure proportional to said deviation, and means applying said last mentioned pressure proportional to said deviation to a motor controlling the pressure of a fluid from a source of fluid to furnish an output fluid pressure.

9. An elastic fluid pressure actuated controller, including, a first deviation section comprising a first positive feedback pressure chamber, a set point pressure chamber, a process variable pressure chamber, and a first negative feedback pressure chamber, and a second deviation section comprising a second positive feedback pressure chamber, a second negative feedback pressure chamber, an input pressure chamber, and a negative feedback pressure modified chamber, means responsive to the resultant of the pressures in the first deviation section and varying the pressure from a source of fluid pressure to provide a pressure having a component proportional to the deviation between the pressures in said process variable pressure chamber and said set point pressure chamber and said first positive feedback pressure chamber, means differentiating a pressure containing said component proportional to said deviation to provide a pressure proportional to the derivative with respect to time of said deviation, means integrating said pressure proportional to the derivative with respect to time of said deviation to provide a pressure proportional to said deviation, means applying to said second deviation section said pressure proportional to the derivative with respect to time of said deviation and said pressure proportional to said deviation, means connecting said first positive feedback pressure chamber to said second positive feedback pressure chamber to equalize the pressure of the fluid in said chambers, and a third deviation section having a motor chamber connected to the pressure in said positive feedback pressure chambers so as to be actuated thereby.

10. An elastic-fluid-pressure-actuated controller, including, a first deviation section comprising a first positive feedback pressure chamber, a set point pressure chamber, a process variable pressure chamber, and a first negative feedback pressure chamber, and a second deviation section comprising a second positive feedback pressure chamber, a second negative feedback pressure chamber, an input pressure chamber, and a negative feedback pressure modified chamber, means responsive to the resultant of the pressures in the first deviation section and varying the pressure from a source of fluid pressure to provide a pressure proportional to the deviation between the pressures in said process variable pressure chamber and said set point pressure chamber and said first positive feedback pressure chamber, means differentiating a pressure containing said components proportional to said deviation to provide a pressure proportional to the derivative with respect to time of the deviation, means integrating said pressure proportional to the derivative with respect to time of said deviation to provide a pressure proportional to said deviation, means responsive to the resultant of the pressures in said second deviation section and regulating the pressure from a source of fluid pressure and applying said pressure to said negative feedback pressure modified chamber, means connecting said first negative feedback pressure chamber and said first positive feedback pressure chamber together and operable to produce in said first positive feedback pressure chamber a pressure component proportional to reset, a third deviation section having a motor chamber and a negative feedback chamber, means connecting said first and said second positive feedback chambers to said motor chamber so that the pressure in said positive feedback chambers operates said third deviation section, and means connecting a pressure responsive to the output of said third deviation section to the negative feedback chamber of said third deviation section.

11. An elastic fluid pressure actuated controller, including, a first deviation section having four chambers therein, a second deviation section having four chambers therein, a third deviation section having two oppositely acting pressure chambers therein, means responsive to the resultant of the pressures in the chambers of said first deviation section regulating the pressure in one of the chambers of said second deviation section, means responsive to the resultant of the pressures in the chambers of said second deviation section regulating the pressure in another chamber of said second deviation section, means responsive to both of said resultants regulating the pressure in one of the chambers of said third deviation section, and means responsive to the resultant of the pressures in the chambers of said third deviation section and regulating the pressure in the other of the chambers of said third deviation section.

12. A controller actuated by the pressure of an elastic fluid, including, a first deviation section having a plurality of chambers therein including a first positive feedback chamber and a negative feedback chamber, a second deviation section having a plurality of chambers therein including at least a negative feedback pressure modified chamber, and a second positive feedback chamber, a first valve responsive to the resultant of the pressures in the chambers of said first deviation section and regulating a pressure, a first restriction connected between the pressure regulated by said first valve and said negative feedback chamber and having a capacity for fluid flow less than that of said first valve, a second valve responsive to the resultant of the pressures in the chambers of said second deviation section and regulating a fluid pressure, a connection between the pressure regulated by said second valve and said negative feedback pressure modified chamber, a second restriction connected between said negative feedback pressure modified chamber and said second positive feedback chamber and having a capacity for fluid flow less than that of said second valve, and a third restriction connected between said negative feedback chamber and said positive feedback chamber, the pressure in said positive feedback chamber being the output pressure of said controller.

13. A controller actuated by the pressure of an elastic fluid, including, a first deviation section having a plurality of chambers therein including a negative feedback pressure chamber, a second deviation section having a plurality of chambers therein including a positive feedback pressure chamber and a negative feedback pressure modified chamber, a first valve responsive to the resultant of the pressures in the chambers of said first deviation section, a first restriction connected between the pressure controlled by said valve and said negative feedback pressure chamber and having a capacity for fluid flow less than that of said valve, a second valve responsive to the resultant of the pressures in the chambers of the said second deviation chambers, a connection conducting fluid at the pressure set by said second valve to said negative feedback pressure modified chamber, and a second restriction connected between said negative feedback pressure modified chamber and said positive feedback pressure chamber and having a capacity for fluid flow less than that of said second valve, the pressure in said positive feedback chamber being the output pressure of said controller.

14. A controller actuated by the pressure of an elastic fluid, including, a first valve operable to derive a pressure containing an error signal in response to the difference existing at any instant between a pressure proportional to the process variable and a pressure proportional to that value of the process variable which it is desired to maintain, a first restriction connected under the control of said first valve, means to operate said first valve in response to the difference between a negative feedback pressure under the control of said first valve and a positive feedback pressure which has passed through said first restriction to derive a pressure from which the integral of said error signal has been removed and which is proportional to said error signal, a second valve, a pilot valve under the control of said second valve, a second restriction connected to the output pressure of said pilot valve, and means for actuating said second valve in response to any difference between said positive feedback pressure and the pressure which has passed through said second restriction to derive a pressure which is a proportional plus integral function of the error signal.

15. A controller actuated by an elastic fluid, including, a first valve operable to derive a pressure containing an error signal in response to the pressure difference existing at any time between a pressure proportional to the process variable and a pressure proportional to that value of said process variable which it is desired to maintain, a pilot valve connected under the control of said first valve and operable to produce an output signal, a first restriction connected to the output of said pilot valve, a second valve, a second restriction connected to a pressure under the control of said second valve, means for actuating said first valve in response to any difference between the pressure under the control of said second valve and the pressure which has passed through said second restriction to derive a pressure having a component proportional to the integral or reset mode of operation, and means actuating said second valve in response to any difference between the pressure which has passed through said first restriction and the pressure which has passed through said second restriction to derive a pressure which is a proportional plus integral or reset function of the error signal.

16. A controller actuated by an elastic fluid, including, a first conduit connected to a pressure proportional to the process variable, a second conduit connected to a pressure proportional to that value of said process variable which it is desired to maintain, a first pressure-operated motor connected to one of said conduits, a second pressure-operated motor connected to the other of said conduits, a first restriction connected between said motors, a second restriction and a third restriction connected in series in one of said conduits, one side of said first restriction being connected between said second restriction and said third restriction.

17. Apparatus for adjusting the proportional band of a controller actuated by the pressure of an elastic fluid, said apparatus including, a first valve operated in response to the difference existing at any instant between the instantaneous value of the process variable and a value proportional to a desired set point so as to derive a pressure containing a component comprising an error signal proportional to said difference, a first restriction connected at one side to said pressure containing the error signal or to a pressure proportional thereto, a first pressure-operated motor connected to be controlled by the pressure at the opposite side of said first restriction, a second valve connected so as to be actuated in one direction by said first motor, a second restriction connected at one side to the pressure controlled by said second valve, a second pressure-operated motor connected to the other side of said second restriction and having operative connection with said second valve to operate it in the opposite direction to said first motor and having operative connection with said first valve to operate it in the same direction as said process variable, and a third pressure-operated motor directly connected to the junction between said second valve and said second restriction and having operative connection with said first valve to operate it in the opposite direction to said process variable, said first and second restriction being manually adjustable to vary the proportional band of said controller.

18. Apparatus for adjusting the proportional band of a controller actuated by air pressure, said apparatus including: an air-supply line subject to pressure variations; a first flow-line connected to said air-supply line and including, a first fixed flow-resistance, a first flow-varying valve, a first variable flow-resistance, and a first motor; a second flow-line connected to said air-supply line and including, a second fixed flow-resistance, a second flow-varying valve, a second variable flow-resistance, a second motor, and a third motor; first means responsive to the magnitude of a condition for adjusting said first flow-varying valve in one direction with a force proportional to said magnitude; second means for adjusting said first flow-varying valve in the opposite direction with a force proportional to the magnitude of the desired value of the condition; said first and second means cooperating to adjust said first flow-varying valve to produce in said first flow line at a point between said first fixed flow-resistance and said first variable flow-resistance a pressure varying as a function of the magnitude of and of the rate of change of and of the time-integral of said condition; said first motor and said second motor cooperating in response to changes of pressure therein to adjust said second flow-varying valve to produce in said second flow-line at a point between said second fixed flow-resistance and said second variable flow-resistance and in said third motor a pressure varying substantially proportionally to a function of the magnitude of and to the time-integral of said condition; said second motor and said third motor cooperating in response to changes of pressure therein to adjust said first flow-varying valve with a force opposite in direction and proportional to the difference between the forces applied to said first flow-varying valve by said first and by said second means; said first and second variable flow resistances being adjustable to predetermine the width of the proportional band of the controller by varying the extent of operation of said first and second flow-varying valves in response to a given change in the unbalanced pressures in said first and second flow-lines.

19. A controller actuated by an elastic fluid, including, a first valve operable to derive a pressure containing an error signal in response to a first force caused by the difference existing at any time between the instantaneous value of the process variable and that value of the process variable which it is desired to maintain, a first restriction connected to a pressure under the control of said first valve, a second valve, a second restriction connected to a pressure under the control of said second valve, means for actuating said first valve in response to any difference between the pressure under the control of said second valve and the pressure which has passed through said second restriction so as to move said first valve with a force proportional to the said error signal and opposing said first force, and means actuating said second valve in response to any difference between the pressure which has passed through said first restriction and the pressure which has passed through said second restriction to derive a pressure which is a proportional plus the time-integral function of the error signal.

20. Means for adjusting the proportional band or throttling range of an elastic-fluid-actuated controller, including, means movable in response to any difference between the value of the process variable at the instant and that value of the process variable which it is desired to maintain, a first conduit connected through a fixed restriction to a supply of fluid under pressure, a first valve in said first conduit and operable by said means to vary the pressure of the fluid in said first conduit, a first restriction in said first conduit and connected on its inlet side to receive fluid at a pressure controlled by said first valve, a second conduit connected through a fixed restriction to a supply of fluid under pressure, a second valve in said second conduit, a second restriction in said second conduit and connected on its inlet side to receive fluid at a pressure controlled by said second valve, a first motor in said first conduit and connected to be controlled by the pressure at the outlet side of said first restriction and engaging said second valve and operating it to vary the pressure of the fluid in said second conduit, a second motor in said second conduit and connected to the outlet side of said second restriction and engaging said second valve and operating it in the reverse direction to the direction in which said second valve is operated by said first motor, a third motor in one of said conduits and connected to the outlet side of one of said first or second restrictions and engaging said first valve and operating it in the reverse direction to the direction in which said first valve is actuated by said means, at least one of said first restriction and said second restriction being manually adjustable, thereby to adjust the proportional band or throttling range of the controller, and an output connection connected to at least one of said conduits and adapted to supply an output fluid pressure at a pressure adjusted by the operations of said first and second valves.

21. Apparatus for adjusting the proportional band of a controller actuated by the pressure of an elastic fluid, said apparatus including, a first elastic-fluid-conducting network connected at one or more places to a supply of elastic fluid under pressure, a second elastic-fluid-conducting network connected at one or more places to a supply of elastic fluid under pressure, first means operable to vary the pressure of the fluid in one of said networks to produce an error signal comprising a variation in the pressure of the fluid in said network proportional to the difference between the value of the process variable at any instant and that valve of the process variable which it is desired to maintain, second means operable to vary the pressure of the fluid in one of said networks to produce an error plus rate signal comprising a variation in the pressure of the fluid in said network proportional to said error signal plus the first derivative of said error signal with respect to time, third means operable to vary the pressure of the fluid in one of said networks to produce a reset signal comprising a variation in the pressure of the fluid in said network proportional to the integral of said error signal with respect to time, fourth means operable in response to the interaction of said second means and said third means in opposition to each other to vary the pressure of the fluid in one of said networks to produce an output signal comprising a variation in the pressure of the fluid in said network proportional to said error signal plus the first derivative of said error signal with respect to time minus the integral of said error signal with respect to time, i. e. proportional to said error signal, and manually operable means to adjust the speed of operation of said second means relative to said third means and thereby to adjust the proportional band of the controller.

22. A controller actuated by the pressure of an elastic fluid, including, a first valve connected to a supply of elastic fluid under pressure and operable in response to the difference existing at any instant between the pressure proportional to the process variable and a value of said process variable which it is desired to maintain, said first valve being operable to vary the pressure of the fluid to produce an error signal comprising a variation in the pressure of the fluid proportional to the difference between the value of the process variable at any instant and that value of the process variable which it is desired to maintain, a first restriction connected at its inlet side to said first valve to receive fluid at a pressure controlled by said first valve, said error signal causing fluid to flow through said first restriction and to produce a rate signal comprising a variation in the pressure in the fluid on the outlet side of said first restriction proportional to the first derivative of said error signal with respect to time, a second valve connected to a supply of elastic fluid under pressure and operable to vary the pressure in said fluid, means to operate said second valve actuated in one direction by the pressure of the fluid controlled by said first valve and in the opposite direction by the pressure of the fluid on the outlet side of said first restriction, a second restriction connected on its inlet side to the fluid controlled by said second valve, any difference in the pressure of the fluid on the inlet side of said second restriction and controlled by said second valve causing a flow of fluid through said second restriction to produce in the fluid on the output side of said second restriction a pressure from which the reset component has been cancelled so that said pressure is proportional to the error signal, second means to actuate said second valve and operate it in one direction by the pressure on the inlet side of said second restriction and in the opposite direction by the pressure on the outlet side of said second restriction, and third means to operate said first valve by the pressure on the outlet side of said first restriction in a direction to cancel said error signal.

23. An elastic-fluid-pressure-actuated controller, including, first valve means operable in response to the deviation of a measured variable from a predetermined value to create a first fluid pressure difference proportional to said deviation, a restriction connected to said first valve means and receiving said first fluid pressure difference and acting on a flow of fluid through said restriction to create a second fluid pressure difference proportional to said deviation plus the derivative of said deviation with respect to time, second valve means operable in response to the resultant of said pressure differences to create a third fluid pressure difference proportional to the derivative of said deviation with respect to time, a second restriction connected to said second valve means and receiving said third fluid pressure difference and adapted to integrate the flow of fluid under pressure therethrough to create an integrated fluid pressure difference proportional to said deviation, and means subjecting said first valve means to the force resulting from any difference between said second pressure difference and said integrated pressure difference.

References Cited in the file of this patent

UNITED STATES PATENTS 2,360,889    Philbrick  \_\_\_\_\_\_\_\_\_\_\_\_\_\_ Oct. 24, 1944

(Other references on following page)

UNITED STATES PATENTS

| | | |
|---|---|---|
| 2,505,981 | McLeod | May 2, 1950 |
| 2,517,051 | Swenson | Aug. 1, 1950 |
| 2,586,637 | Fitch | Feb. 19, 1952 |
| 2,588,622 | Eckman | Mar. 11, 1952 |
| 2,638,911 | Griswold et al. | May 19, 1953 |
| 2,638,922 | Caldwell | May 19, 1953 |
| 2,651,317 | Heinz | Sept. 8, 1953 |

FOREIGN PATENTS

| | | |
|---|---|---|
| 536,537 | Great Britain | May 19, 1941 |
| 544,643 | Great Britain | Apr. 22, 1942 |
| 544,753 | Great Britain | Apr. 22, 1942 |
| 568,634 | Great Britain | Apr. 13, 1945 |
| 878,268 | France | Oct. 5, 1942 |

OTHER REFERENCES

Moore Products Co., Philadelphia, Pa. Instructions 505–S, Nullmatic Controller, 1948, pages 2–7.